United States Patent
McGrath et al.

(10) Patent No.: US 7,135,110 B2
(45) Date of Patent: Nov. 14, 2006

(54) DENITRIFICATION SYSTEM FOR NITRIFIED WASTEWATER OR NITRIFIED WATER

(76) Inventors: Michael B. McGrath, 125 Cliffwood La., Falmouth, MA (US) 02540; Michael Kenny, 34 Autumn La., So. Hamilton, MA (US) 01982

( * ) Notice: Subject to any disclaimer, the term of this patent is extended or adjusted under 35 U.S.C. 154(b) by 0 days.

(21) Appl. No.: 11/071,053

(22) Filed: Mar. 2, 2005

(65) Prior Publication Data

US 2005/0189277 A1 Sep. 1, 2005

Related U.S. Application Data

(62) Division of application No. 10/101,402, filed on Mar. 19, 2002, now Pat. No. 6,875,355.

(60) Provisional application No. 60/277,242, filed on Mar. 20, 2001.

(51) Int. Cl.
*C02F 3/00* (2006.01)

(52) U.S. Cl. .................. 210/198.1; 210/201; 210/202; 210/203; 210/209

(58) Field of Classification Search ............. 210/198.1, 210/201–203, 209
See application file for complete search history.

(56) References Cited

U.S. PATENT DOCUMENTS

| | | | |
|---|---|---|---|
| 2,536,196 A | 1/1951 | MacLeod | |
| 4,039,438 A | 8/1977 | Anderson | |
| 4,159,945 A | 7/1979 | Savage | |
| 4,225,430 A | 9/1980 | Bosman | |
| 4,576,717 A | 3/1986 | Collin et al. | |
| 4,892,658 A | 1/1990 | Martin et al. | |
| 4,917,536 A | 4/1990 | Glasser | |
| 5,185,080 A | 2/1993 | Boyle | |
| 5,190,655 A | 3/1993 | Karlsson | |
| 5,211,847 A | 5/1993 | Kanow | |
| 5,318,699 A | 6/1994 | Robertson et al. | |
| 5,342,522 A | 8/1994 | Marsman et al. | |
| 5,588,777 A | 12/1996 | Laak | |
| 5,597,264 A | 1/1997 | Laak | |
| 5,676,828 A | 10/1997 | Kallenbach et al. | |
| 5,863,435 A | 1/1999 | Heijnen et al. | |
| 5,908,555 A | 6/1999 | Reinsel et al. | |
| 5,951,203 A | 9/1999 | Laak | |
| 6,875,355 B1 * | 4/2005 | McGrath et al. | 210/601 |

* cited by examiner

*Primary Examiner*—Chester T. Barry
(74) *Attorney, Agent, or Firm*—John H. Pearson, Jr., Esq.; Walter F. Dawson, Esq.; Pearson & Pearson, LLP

(57) ABSTRACT

A denitrification system for denitrified wastewater or nitrified water treatment using a detergent or detergent-like compound comprising available carbon. The system comprises a plurality of interconnected tanks including a mixing tank which feeds detention tanks which in combination provide a detention time period for the effluent. A controller determines the amount of detergent dispensed into the mixing tank in accordance with the measured volume of effluent to be treated. The mixing tank comprises a heater for maintaining the nitrified effluent temperature above 50 degrees F. An optional line filter can be added to the output of the system for further reducing organic nitrogen concentration. An alternate embodiment comprises passing the final denitrified effluent through a pump chamber for pumping of the effluent to a sand filter capable of reducing bacterial populations.

16 Claims, 2 Drawing Sheets

DENITRIFICATION SYSTEM FOR NITRIFIED WASTEWATER OR NITRIFIED WATER

This application is a divisional application of application Ser. No. 10/101,402, filed Mar. 19, 2002, now U.S. Pat. No. 6,875,355, which claims the benefit of U.S. Provisional Application No. 60/277,242, filed Mar. 20, 2001.

BACKGROUND OF THE INVENTION

1. Field of the Invention

This invention relates to wastewater treatment systems and in particular to an apparatus and method for denitrification of nitrified wastewater or nitrified water with detergent or detergent-like compounds comprising available carbon.

2. Description of Related Art

Excessive concentrations of nitrogen in the form of nitrite and nitrate in water in the environment or in water discharged to the environment has both health risks to human beings and potential adverse consequences to aquatic environments. Nitrate is in the form of $NO_3$ and Nitrite is in the form of $NO_2$. Water with nitrate or nitrite concentrations is sometimes called nitrified water. Both are oxidized compounds of nitrogen. These compounds are considered inorganic forms of nitrogen.

According to Federal Environmental Protection Agency (EPA) Drinking Water standards, the Maximum Contaminant Level is 10 milligrams per liter of nitrate nitrogen or $NO_3$ for safe drinking water. For estuarine environments, concentrations above 0.32 milligrams per liter of nitrate nitrogen or $NO_3$ can cause adverse impacts from excessive algae growth. Concentrations above 0.5 milligrams per liter of $NO_3$ have been found to accelerate eutrophication of coastal waters. Significant efforts are being made to remove and reduce the concentrations of nitrates and nitrites in water.

A denitrification process can be used for any nitrified water. Typical nitrified water is treated wastewater, ground water, process waters and some runoffs. Denitrification in nature occurs when water with concentrations of nitrite and nitrate are introduced into an anaerobic environment with a carbon source available. The carbon material is an electron donor. Denitrification in man-made processes traditionally involve a variety of carbon sources.

The prior art involving denitrification of treated wastewater use methanols and similar organic compounds. Such compounds are carcinogenic and explosive. These compounds require special handling, special construction and pose a threat to the environment from accidental release. Denitrification systems using methanol and similar compounds require venting to release an excessive mass of methanol. The use of methanol and similar compounds in treating wastewater may require the addition of a base substance to bring the effluent pH to near neutral values.

Various types of carbon sources have been investigated by many parties. U.S. Pat. No. 5,342,522, issued Aug. 30, 1994 to Eric H. Maraman et al., discloses a method for the treatment of sewage effluent comprising a step of denitrification using a carbon source such as the addition of methanol or internally generated fatty acids, for example, acidified surplus sludge. The carbon source must be well matched to the nitrate content of the effluent in order to prevent nitrate passing into the effluent. However, the use of methanol involves handling and storage of a poisonous, hazardous and explosive liquid. The use of internally generated fatty acids involves a physical effort to obtain the carbon source from the process and is complicated requiring a very skilled practitioner. The denitrification system in the Maraman patent requires that the fluid in the denitrification vessel be stirred by a paddle. Such paddles involve the use of energy and involve inevitable maintenance effort in a hazardous environment.

U.S. Pat. No. 5,588,777 issued Dec. 31, 1996 to Rein Laak discloses a wastewater treatment system that uses soaps for denitrification purposes in two different designs of wastewater systems. However, soaps are a processed animal fat, and certain soaps comprise significant concentrations of total nitrogen. This patent describes a dosing of soap as a carbon source in a rock layer in the bottom of a stratified filter. The Applicant, Michael B. McGrath, built a similar physical environment for denitrification in 1985 whereby, in constructing a Residential RUCK TM system, a mixing tank in which soap (from separated plumbing) was added to nitrified water which fluid then drained to a chamber filled with rock. Denitrification occurred in the mixing tank and in the rock filled chamber. Within a year, the voids in the rock chamber completely filled with a bacterial growth and completely clogged. The Laak patent relies on a similar situation where denitrification would occur in voids in a stone layer. The Laak design is such that if clogging does occur, there is no physical access to observe if that clogging is taking place and no access to clean the clogging should it occur.

In another system referred to as the Lunenburg RUCK CFT system, dishwashing liquid soap was used as a carbon source and it was unsuccessful as a carbon source. The denitrification portion of the system did not effectively denitrify. The Total Nitrogen concentration of that soap exceeded 129 milligrams per liter. The soap added nitrogen to a system designed to reduce nitrogen. A test was made of various laundry detergents by adding the manufacturers suggested amount of detergent to a standard wash in a washing machine and the measured concentrations of Total Nitrogen were in the range of 1 to 2 parts per million or milligrams per liter.

U.S. Pat. No. 5,185,080, issued Feb. 9, 1993 to Gregory Boyle discloses a system to denitrify wastewater by introducing bacteria and a source of carbon such as from milk or milk by-products into a detention treatment chamber and maintaining the temperature above about 48–50 degrees Fahrenheit. Boyle describes a pelletized form of carbon introduced daily. In the Boyle patent, the nitrate concentration is described as being more or less constant, the temperature of household effluent is described as always at about 48–50 degrees, denitrification is complete in four hours and the government must be a co-permittee in the operation and maintenance of an on site denitrification system. The carbon form in a pelletized form allows no flexibility in the mass of nitrogen removed during denitrification. The mass of nitrogen cannot be adjusted. The fixed mass of the pelletized detergent provides no ability for the denitrification portion of the treatment system to respond to variations in the daily flow of the treatment system.

Nitrate concentrations in residential wastewater are not constant. The concentration of nitrogen in wastewater has increased due to changes in the materials in household chemicals and the change in volume caused by low flow plumbing fixtures. Various parties promoting alternative innovative on site systems in the Commonwealth of Massachusetts have measured total nitrogen in household wastewater in reports to the Massachusetts Department of Environmental Protection. In several reports, the average influent total nitrogen concentration in household RUCK systems exceeded approximately 70 parts per million. The description of the Boyle system does not provide a system capable of treating higher concentrations of nitrate in the nitrified water.

Further, the Boyle patent ('080) states that residential wastewater is always in a certain temperature range, namely 48 to 50 degrees Fahrenheit. Normally, that is true. However, there can be places where local conditions could cause the effluent to be lower in temperature than what is stated in the Boyle patent. In Lunenburg, Mass., at the Woodlands Condominiums, a series of sewer pipes and pump stations move wastewater to a central treatment facility called a Commercial Ruck system. The temperature of the effluent entering the treatment system can reach 48 degrees Fahrenheit. An aeration stage drops the temperature to 44 degrees Fahrenheit. At that temperature, denitrification will not take place. At that temperature, denitrification will not start when the system is initially started. These temperatures are lower than the temperature described in the Boyle patent.

The Boyle patent further discloses that denitrification takes only four hours and relates to the system described in that patent and to the quantity of the concentration of nitrate in the effluent. In actual field performance, the time for complete denitrification can take up to forty hours with nitrified water at 50 degrees Fahrenheit and with detergent as a carbon. The short detention time in the Boyle patent for denitrification will result in incomplete denitrification.

U.S. Pat. No. 4,039,438, issued Aug. 2, 1977 to Donald R. Anderson discloses a process for the anaerobic biological denitrification of water comprising contacting water containing nitrate and organic material with cellulosic substrate sufficient to support biological denitrification and maintaining the water at a temperature from 50 degrees Fahrenheit to about 120 degrees Fahrenheit for a period of time from a few minutes to about 24 hours to effect the denitrification. However, the process in Anderson's patent relies on the upwelling of nitrified water through a quantity of cellulosic substrate. The carbon source in the cellulosic substrate will be exhausted and is difficult to replace in traditional mixing chambers and detention tanks. Typical manholes used in traditional wastewater treatment structures are 24 to 30 inches in diameter. Pump chambers have rectangular openings called hatches, which typically are 48 by 48 inches. Such hatches can be installed in detention and mixing tanks. These openings are too small for the replenishment of the cellulosic material in relation to the volume of the nitrified water to be treated. Since the description of denitrification is by upwelling, a special tank or container must be constructed. Such special tanks will be expensive.

SUMMARY OF THE INVENTION

Accordingly, it is therefore an object of this invention to provide a method and apparatus for denitrification of wastewater or nitrified water with detergent or detergent-like compounds comprising available carbon.

It is another object of the invention to provide a denitrifying method where the final effluent has a pH nearly neutral.

It is a further object of the invention to provide a safe, complete and economical method for the denitrification of nitrified water using detergent or detergent-like compounds comprising available carbon.

It is another object of this invention to provide a denitrification system, using a detergent or detergent-like compound comprising available carbon, comprising a plurality of interconnected tanks including a mixing tank coupled to detention tanks, the mixing tank having a heating element.

It is a further object of the invention to control a volume of detergent or detergent-like compound comprising available carbon dispensed to a mixing tank of a denitrification system in accordance with a measured volume of effluent to be treated entering the system.

It is another object of this invention to provide a method for denitrification of wastewater or nitrified water by providing a mixing tank coupled to a series of detention tanks for establishing a detention period for the effluent mixed with the detergent or detergent-like compounds comprising available carbon prior to effluent exiting the denitrification system.

These and other objects are accomplished by a method for denitrification of nitrified wastewater or nitrified water comprising the steps of providing a series of interconnected tanks underground, each tank having an inlet, an outlet, and a conduit connecting the outlet of a preceding tank to the inlet of a succeeding tank, providing to an inlet of a mixing tank of the series of interconnected tanks, the nitrified wastewater or nitrified water having nitrates and nitrites, mixing a detergent with the wastewater or the nitrified water in the mixing tank to enhance the reduction of the nitrates and nitrites to gaseous nitrous oxide ($N_2O$) and nitrogen ($N_2$), controlling the amount of detergent introduced into the mixing tank in accordance with the flow volume of the nitrified water entering the mixing tank, and feeding effluent from the mixing tank to at least one detention tank in the series of interconnected tanks for establishing a detention period of the effluent. The method comprises the step of providing heating means within the mixing tank to accelerate denitrification of the nitrified wastewater or nitrified water. The step of providing the series of interconnected tanks comprises the step of positioning each one of the series of tanks lower in the ground than a previous one of the series of interconnected tanks to enable gravity flow of effluence between the tanks. The method comprises the step of providing a media within the detention tank to accelerate denitrification. The method comprises the step of connecting a filter to the outlet of a last one of the detention tanks in the series of tanks. The step of mixing a detergent with the nitrified wastewater or nitrified water comprises the step of providing carbon to the nitrified wastewater or nitrified water. The step of mixing a detergent with the nitrified wastewater or nitrified water comprises the step of providing a detergent-like compound including available carbon. The method comprises the step of introducing small doses of bacteria into the mixing tank to initiate the denitrification.

The objects are further accomplished by a denitrification system for treating nitrified wastewater or nitrified water comprising a series of interconnected tanks positioned underground, each tank having an inlet and an outlet and a conduit connecting an outlet of a preceding tank to an inlet of a succeeding tank, a first tank of the series of interconnected tanks receives at the inlet the nitrified wastewater or nitrified water having nitrates and nitrites, means for providing a detergent to the first tank, the detergent enhancing the reduction of the nitrates and nitrites to gaseous nitrous oxide ($N_2O$) and nitrogen ($N_2$) in the resulting effluent, means for controlling the amount of detergent introduced into the first tank in accordance with a flow volume of the nitrified wastewater or the nitrified water entering the first tank, means disposed in one of the series of interconnected tanks for heating the effluent to accelerate denitrification, at least one detention tank in the series of interconnected tanks coupled to an outlet of the mixing tank via the conduit for receiving the effluent from the mixing tank, a pumping chamber connected to an outlet of a last detention tank in the series of interconnected tanks for receiving the effluent from the last detention tank, and a pump attached to the pumping chamber for pumping the effluent to an inlet of a filter, the effluent passing through the filter to an exit outlet. Each tank of the series of interconnected tanks is positioned lower in the ground than a previous one of the tanks to enable gravity flow of the effluence between the tanks. The heating means heats the effluent to greater than 50 degrees Fahrenheit to accelerate denitrification of the nitrified wastewater or the nitrified water. The detention tank comprises a media to accelerate denitrification. The detergent comprises carbon for mixing with the nitrified wastewater or the nitrified water. Also, the detergent includes a detergent-like compound including available carbon. The first tank of said system may receive small doses of bacteria to initiate a denitrification process for treating the nitrified wastewater or the nitrified water.

The objects are further accomplished by a denitrification system for treating nitrified wastewater or nitrified water comprising a series of interconnected tanks positioned underground, each tank having an inlet and an outlet and a conduit connecting an outlet of a preceding tank to an inlet of a succeeding tank, a first tank of the series of interconnected tanks receives at the inlet the nitrified wastewater or nitrified water having nitrates and nitrites, means for providing a detergent to the first tank, the detergent enhancing the reduction of the nitrates and nitrites to gaseous nitrogen dioxide nitrous oxide ($N_2O$) and nitrogen ($N_2$) in the resulting effluent, means for controlling the amount of detergent introduced into the first tank in accordance with a flow volume of the nitrified wastewater or the nitrified water entering the first tank, means disposed in one of the series of interconnected tanks for heating the effluent to accelerate denitrification, at least one detention tank in the series of interconnected tanks coupled to an outlet of the mixing tank via the conduit for receiving the effluent from the mixing tank, a pumping chamber connected to an outlet of a last detention tank in the series of interconnected tanks for receiving the effluent from the last detention tank, and a pump attached to the pumping chamber for pumping the effluent to an inlet of a filter, the effluent passing through the filter to an exit outlet. Each tank of the series of interconnected tanks is positioned lower in the ground than a previous one of the tanks to enable gravity flow of the effluence between the tanks. The heating means heats the effluent to greater than 50 degrees Fahrenheit to accelerate denitrification of the nitrified wastewater or the nitrified water. The detention tank comprises a media to accelerate denitrification. The detergent comprises carbon for mixing with the nitrified wastewater or the nitrified water. Also, the detergent includes a detergent-like compound including available carbon. The first tank of said system may receive small doses of bacteria to initiate a denitrification process for treating the nitrified wastewater or the nitrified water.

The objects are further accomplished by a denitrification system for treating nitrified wastewater or nitrified water comprising a series of interconnected tanks positioned underground, each tank having an inlet and an outlet and a conduit connecting an outlet of a preceding tank to an inlet of a succeeding tank, a first tank of the series of interconnected tanks receives at the inlet the nitrified wastewater or nitrified water having nitrates and nitrites, means for providing a detergent to the first tank, the detergent enhancing the reduction of the nitrates and nitrites to gaseous nitrous oxide ($N_2O$) and nitrogen ($N_2$) in the resulting effluent, means for controlling the amount of detergent introduced into the first tank in accordance with a flow volume of the nitrified wastewater or the nitrified water entering the first tank, means disposed in one of the series of interconnected tanks for heating the effluent to accelerate denitrification, at least one detention tank in the series of interconnected tanks coupled to an outlet of the mixing tank via the conduit for receiving the effluent from the mixing tank, a pumping chamber connected to an outlet of a last detention tank in the series of interconnected tanks for receiving the effluent from the last detention tank, and a pump attached to the pumping chamber for pumping the effluent to an inlet of a filter, the effluent passing through the filter to an exit outlet. Each tank of the series of interconnected tanks is positioned lower in the ground than a previous one of the tanks to enable gravity flow of the effluence between the tanks. The heating means heats the effluent to greater than 50 degrees Fahrenheit to accelerate denitrification of the nitrified wastewater or the nitrified water. The detention tank comprises a media to accelerate denitrification. The detergent comprises carbon for mixing with the nitrified wastewater or the nitrified water. Also, the detergent includes a detergent-like compound including available carbon. The first tank of said system may receive small doses of bacteria to initiate a denitrification process for treating the nitrified wastewater or the nitrified water.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DESCRIPTION OF ILLUSTRATIVE EMBODIMENTS

Figure 1:
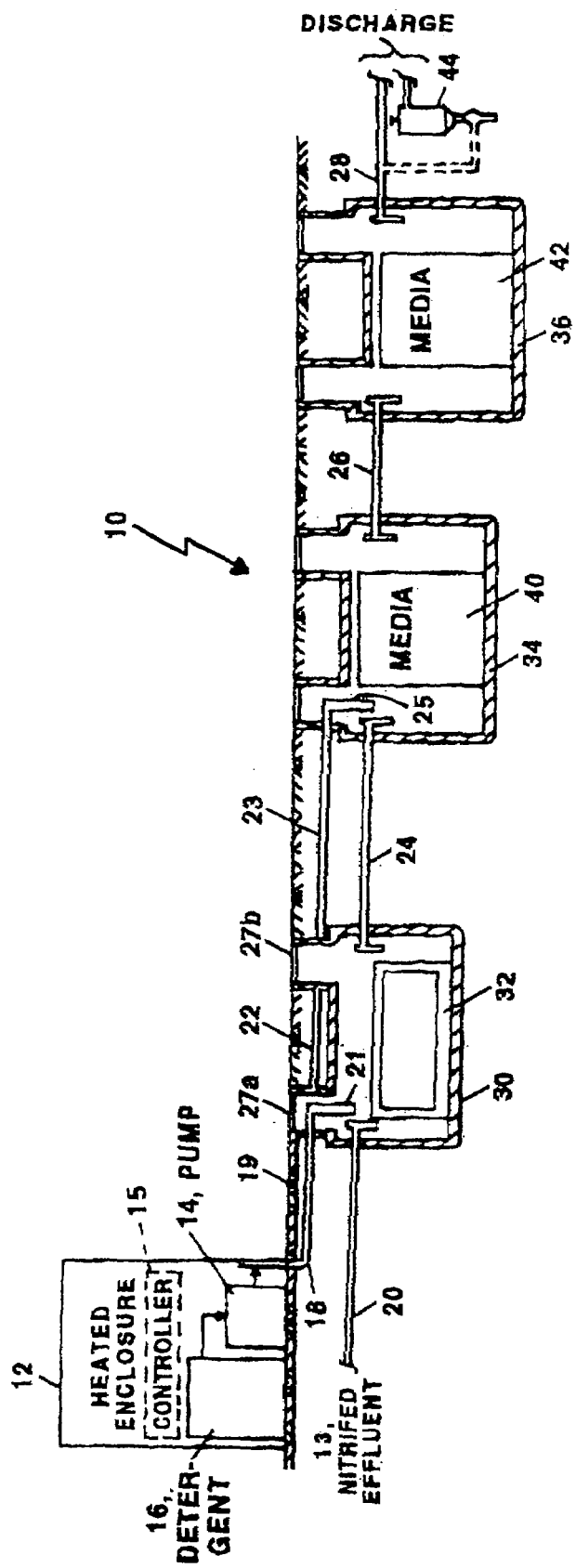
FIG. 1 is a side elevational, partial cross-sectional view of a denitrification system for treatment of nitrified wastewater or nitrified water.

Referring to FIG. 1, a side elevational, partial cross-sectional view of the invention of the denitrification system 10 for treating nitrified wastewater or nitrified water is shown. A method of denitrification comprises steps for removing nitrate ($NO_3$) and nitrite ($NO_2$) from nitrified wastewater or nitrified water. The method is bacterial driven and the nitrates and nitrites are reduced to nitrous oxide $N_2O$ and nitrogen $N_2$ which are gaseous forms of nitrogen released into the atmosphere.

The term "wastewater" herein is meant to include any waste stream containing organic nitrogenous compounds and includes domestic and business sewage and waste. The term "nitrified water" refers to water with nitrate or nitrite concentration and includes treated wastewater, ground water, process waters and some runoff. The term "effluent" as used herein refers to wastewater or any modification thereof at any given point along the wastewater treatment system. "Nitrified effluent" refers to the nitrified wastewater or nitrified water entering the denitrification system 10.

The denitrification system 10 removes concentration of nitrate and nitrite below detection levels. The denitrification system 10 comprises a heated enclosure 12 comprising a container of detergent 16 or detergent-like compound comprising available carbon which is fed to a pump 14. Pump 14 forces the detergent into a conduit or pipe 18 which extends into the ground surface. An alternate conduit or pipe 22 connects to pump 14 and passes behind mixing tank cover 27a; pipe 23 is an extension of pipe 22 and passes behind the top cover 27b of the mixing tank 30 in FIG. 1. Beneath the ground surface 19 are a plurality of tanks 30, 34, 36 which are interconnected via conduits or piping. A conduit or pipe 24 is attached between an outlet of mixing tank 30 and an inlet of detention tank 34. A pipe 26 is attached between an outlet of detention tank 34 and an inlet of detention tank 36. Each of the pipes 24, 26 is angled downward at the inlet side of the tanks 34, 36 to facilitate gravity flow of effluent from tank to tank. Each of the tanks 30, 34, 36 is positioned lower in the ground than a previous tank to promote gravity flow of effluents from tank to tank. A conduit or pipe 28 extending from the outlet side of detention tank 36 provides for discharge of denitrified water from the denitrification system 10.

Tank 30 is a mixing chamber into which the detergent 16 is pumped via pipe 18 to mix with nitrified wastewater or a nitrified effluent 13 which enters tank 30 via inlet pipe 20 at a low velocity. A heater 32 is positioned within the mixing tank 30 to maintain an optimum temperature typically above 50 degrees Fahrenheit. Better efficiency is obtained the higher the temperature as long as the heater 32 does not kill the bacteria.

The detergent 16 or detergent-like compounds comprising available carbon are synthetic compounds which are not soaps. Soaps may comprise significant concentrations of total nitrogen but laundry detergents used herein comprise insignificant amounts of nitrogen compounds. Laundry detergents or detergent-like compounds comprising available carbon usually contain total organic content of about 4%. Most have low-total nitrogen concentrations. Laundry detergents or detergent-like compounds comprising available carbon such as Purex®, Tide® and other off the shelf detergents can be used. There are manufacturers of detergents who can modify the makeup of detergent to reduce or eliminate foaming agent. In the Lunenburg RUCK CFT system, discussed hereinbefore in the Background of the Invention, a detergent is manufactured called Septic Snow B, which is manufactured with minimal or no nitrogen in the material.

Denitrification requires a carbon source with little or no nitrogen concentration or proportion of the mass of the carbon soaps. Laundry detergents and similar detergent or detergent-like compounds have significant carbon available for denitrification. Detergents are easily handled, easily measured and require no special handling or storage areas.

Detergents also buffer the pH of water with concentrations of nitrates and nitrites. These waters with concentrations of nitrates are almost always acidic.

The detergent 16 is introduced into the tank 30 at or near the head of the flow stream via extension 21; it is added below the liquid level to minimize suds. The detergent 16 is added in pulses; the volume of the detergent is controlled by measuring the flow volume of the incoming nitrified effluent 13 and controlling pump 14 to pump a predetermined volume of detergent 16 into the mixing tank 30. Pump 14 is calibrated to measure the volume pumped per minute for the physical circumstances at the facility. The pump 14 is controlled by a timer to adjust the time the pump operates. The volume of detergent required is provided to the mixing tank 30 by adjusting the duration the pump 14 operates. An alternate source of detergent 16 may be added to the system 10 directly into the first detention tank 34 via pipes 22, 23, 25. As previously stated, pipe 23 is an extension of pipe 22 and pipe 22 is connected to pump 14.

One or more system pumps (not shown) provide the nitrified effluent 13 to the denitrification system 10. The flow volume is determined by measuring the actual volume of nitrified effluent 13 that the system pump has moved in a particular time period and multiplying that number by the time the pump was operating. Determining the nitrified effluent 13 flow volume is known to one of ordinary skill in the art.

Still referring to FIG. 1, the pump 14 specifications are selected specifically for the site characteristics. The pump 14 is sized to overcome the friction in pipe 18, the friction in the fittings and the change in elevation between the intake piping, the highest point in pipeline, and the discharge point. A check valve (not shown) in the discharge point of the piping keeps the piping full and aids in calibrating the pump 14. Pump 14 includes two controls on the face of the pump wherein one controls the time of the stroke and the other controls the volume of the stroke. A controller 15 in the heated enclosure 12 controls the time that the pump 14 operates. Such controller 15 comprises a timer (not shown) that initiates power to the pump 14 when one of the effluent system pumps (not shown), which provide the nitrified effluent 13, turns-off. The timer that controls pump 14 is energized by a relay that initiates the timer once the system pump completes its cycle. The volume moved by the system pump is determined and the timer discharges the appropriate volume of detergent. Pump 14 is commercially available and known to one of ordinary skill in the art. The pump used in the actual installation was an LMI pump C141-35T or equivalent.

The volume of the dispensed detergent 16 varies with the total nitrified effluent 13 volume to be treated by the system 10, the concentration of the nitrate and nitrite in the effluent 13, and the total organic carbon concentration of the detergent 16. For example, if the organic carbon content is 4% and the specific gravity of the detergent or detergent-like compound comprising available carbon is 1.00, after an effluent system pump pumps a volume of nitrified effluent 13 of 880 gallons (somewhere in the treatment system prior to the denitrification system 10), and if the concentration of nitrate nitrogen in the effluent 13 is 25 milligrams per liter, the pump 14 is activated by the controller 15, and the timer in the controller 15 energizes the pump 14 for 25 minutes. In this example given that the pump 14 passes a volume per minute of 1.53 milligrams of detergent or detergent-like compound, then the final effluent from the denitrification system 10 will have a nitrate nitrogen concentration of very low values, generally below detection levels. The time interval in the controller 15 can be varied. If the pump passes a smaller volume of detergent, then the timer is adjusted to energize the pump 14 for a longer time period.

The mixing tank 30 may include baffles (not shown) which divides the tank 30 into portions. Baffle walls are generally solid with perforations cast in place or pipes are installed to connect the portions within the tank.

Referring to FIG. 1, the mixing tank 30 is an enclosed tank embodied with durable materials such as concrete. The tank 30 must be closed with no venting. Covers 27a, 27b are provided at ground level for inspection and maintenance purposes. The introduction of bacteria and the detergent 16 or detergent-like compound comprising available carbon will establish an environment where bacterial growth takes place. The environment in the water must be anaerobic. A media, such as encuspated plastic sheets, bounded in 2 feet by 2 feet by 2 feet cubes, when installed in the tank 30 accelerates denitrification by providing more substrate for bacterial growth and providing longer travel time and slower velocity of the water in the tank by lengthening the path and route of the water in the mixing tank 30. The installation of a small mass of iron and molybdenum in the mixing tank 30 enhances and promotes denitrification because they are micronutrients.

Tanks 34 and 36 are detention tanks. As previously described, tank 34 is lower in the ground than the mixing tank 30 and detention tank 36 is lower in the ground than detention tank 34 to insure the gravity flow of effluent from tank to tank. The conduit or pipe 26 is attached between an outlet of tank 34 and an inlet of tank 36. The detention tanks 34, 36 along with the mixing tank 30 provide the detention time for denitrification of nitrified wastewater or nitrified water to occur, typically over a period of approximately 24 hours with the temperature of the effluent maintained above 50 degrees Fahrenheit.

Detention tanks 34 and 36 each comprises a media 40, 42 respectively. The media comprises encuspated plastic sheets bound in 2 feet by 2 feet by 2 feet cubes. The media 40, 42 is placed in each tank 34, 36 to be snug against opposite sidewalls of the tanks. The media 40, 42 includes voids that expose the effluent to area for bacteria to grow on. The voids are arranged for the effluent to travel through the media 40, 42 in a multitude of paths. The paths should be continuous but convoluted. The quantity of media 40, 42 in each tank 34, 36 is determined by the volume necessary to be immersed completely in the liquid from slightly above the liquid to the bottom of the tank from manhole to manhole lengthwise. Installation of the media 40, 42 is such that all liquid flows through such media. The media 40, 42 is installed in the detention tanks 34, 36 to accelerate denitrification by providing more substrates for bacterial growth and providing longer travel time and slower velocity of the water in the tank. The detention tanks 34, 36 may include baffles (not shown). The baffles cause the flow of effluent to have a convoluted flow path to eliminate the risk of the "short circuiting". The baffles are typically placed in the tanks 34, 36 during the manufacturing of the precast units. Slots or pipes in the baffles connect the portions of the tanks on either side of the baffles.

The mixing tank 30 may be embodied by a tank that is rectilinear in shape and be at least four feet deep. The width of the tank 30 is at least half or more of the length. The tank 30 is made of precast concrete or other durable material and the width is limited to seven feet in order to enable movement over roads. The width can be wider if the tank is constructed in place. The volume of the mixing tank 30 is based on providing 6 hours detention time of daily design flow or 25% of the daily design flow.

The detention tanks 34, 36 may be embodied by a tank that is rectilinear in shape and be at least four feet deep similar to the mixing tank 30. The width of the tanks 34, 36 is half the length and are made of precast concrete or other durable material. Again, the width is limited to seven feet in order to enable movement over roads. The width can be wider if constructed in place. The detention tanks 34, 36 are sized so as to, in total, add an additional 18 hours detention time based on daily design flow or 75% of the daily design flow. The size of the pipes for interconnecting the tanks are sized to provide sufficient capacity for peak hourly flow.

Figure 2:
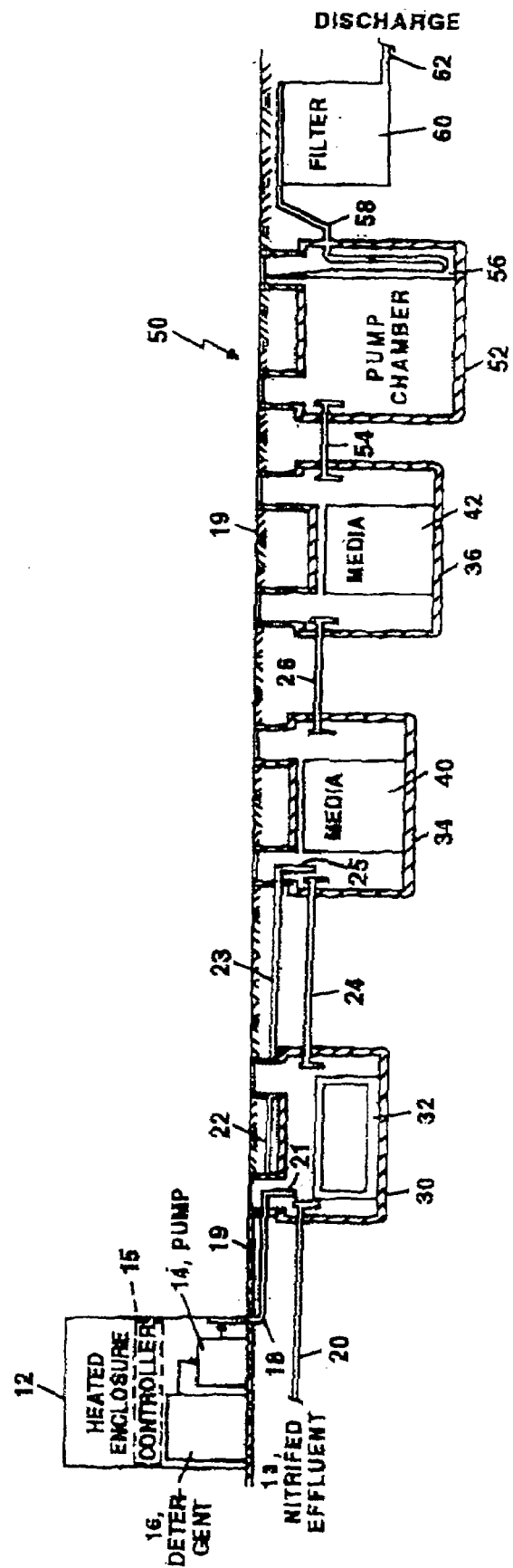
FIG. 2 is a side elevational, partial cross-sectional view of an alternate embodiment of the denitrification system of FIG. 1 which further reduces low concentrations of nitrogen compounds in denitrified wastewater or denitrified water.

Referring now to FIG. 2, a side elevational, partial cross-sectional view is shown of an alternate embodiment of the denitrification system of FIG. 1. This denitrification system so comprises the denitrification system 10 having its final denitrified effluent fed via pipe 54 to a pump chamber 52. The pump chamber 52 comprises a pump 56 which pumps the effluent to a sand filter 60 via pipe 58, and the sand filter comprises an outlet 62. Although a sand filter 60 is used in the preferred embodiment, other filters may be used having the ability to significantly reduce bacterial populations. The removal of significant bacterial populations reduces the concentration of Total Kjeldahl Nitrogen (TKN). The filter 60 will remove or reduce dramatically the Biological Oxygen Demand and Total Suspended Solids of the final effluent. This filter 60 will reduce Total Nitrogen Concentrations to levels below what can be reduced biologically. The characteristics of the pump 56 are based on the local conditions of the site. However, it typically should dose the sand filter 60 at a rate of 25% of the daily design flow, four times a day, at a rate of 0.25 gallons per square feet per dose for low maintenance.

The size of the sand filter 60 is based on the permeability of the same and the question of whether the surface is to be maintained or if the sand filter 60 is backwashed. The purpose of the filter 60 is to remove bacteria which are 15% by mass Nitrogen by removing the bacteria, the Total Nitrogen in the final effluent will be further reduced. The design of dosing the sand filter 60, that is the design flow at a rate of four times a day at a rate of 0.25 gallons per square foot per dose, will effectively provide for very high removal of bacteria and require no maintenance except replacement of the top layer of sands after decades of use. Higher doses will save space but require the filter surface be replaced or backwashed. The design of the smaller sand filters is known to an artisan of ordinary skill in the art. The depth is normally over two feet deep. However, any filter that could effectively remove over 99% of the bacteria could be used in this system 50. There are inline filters used in other types of water use which could be used in this system 50.

Referring again to FIG. 1, the method of denitrification is initiated and maintained by the step of introducing small portions of untreated wastewater in doses of approximately 2.5% (by volume) into the mixing tank 30 which provides the necessary seed of bacteria. Alternately, the addition of readily acquired commercial doses of bacteria can be introduced into the mixing tank 30 as part of this process. In the event of an interruption of the process or during an upset of the process, bacteria may have to be introduced into the mixing tank 30 to restart the process.

The method comprises the step of mixing a detergent 16 or detergent-like compound comprising available carbon with the nitrified wastewater or nitrified water in the mixing tank 30 to enhance the reduction of the nitrates and nitrites to gaseous nitrous oxide ($N_2O$) and nitrogen ($N_2$). Providing the detergent 16 to the mixing tank 30 comprises the step of controlling the amount of detergent introduced into the mixing tank 30 using pump 14, which is determined by measuring the flow volume of the nitrified effluent 13 entering the mixing tank 30 over a time period.

The mixing tank 30 comprises an inlet pipe 20 and outlet pipe 24 which provides for feeding the effluent from the mixing tank 30 to the first of a series of detention tanks 34, 36, each tank positioned lower in the ground than the previous tank to facilitate quantity flow of the effluent.

Denitrification is dependent on the anaerobic conditions, amount of carbon present, amount of bacteria, temperature and time in detention. The total of the mixing tank 30 volume and the detention tanks 34, 36 volume is proportional to the volume of the nitrified effluent and to the temperature of the effluent. As long as a sufficient mass of detergent or detergent-like compound comprising available carbon is provided and all other conditions are satisfied, a total volume of the mixing tank 30 and detention tanks 34, 36 equivalent to two days storage of average flow will completely reduce nitrate and nitrite to below detection levels at the exit pipe 28, if the temperature of the effluent is kept above 50 degrees Fahrenheit. The water may be heated for maximum efficiency.

In the mixing tank 30, bacterial growth is dramatic. The population of heterotrophic bacteria increases to levels exceeding that of untreated wastewater. The biomass of the bacterial is significant. In the growth of the bacteria, a certain portion of the nitrogen compounds available in the nitrified water are used by bacteria to increase the biomass. Nitrogen is a key element in living cells. The concentration of organic nitrogen in the water increases as the water passes through the mixing tank 30 and detention tanks 34, 36. The organic nitrogen concentration is described as the concentration of Total Kjeldahl Nitrogen (TKN). The TKN concentration may be reduced by passing the effluent through a readily acquired commercially available in-line filter 44.

The continual biological bacterial activity in the mixing tank 30 and detention tanks 34, 36, if any, leads to bacterial growth on all surfaces inside the tanks. Bacterial growth continually increases to the point where, on the various surfaces, the growth reaches such a thickness that portions or upper populations are sloughed off into the water. The final effluent has or can have greater concentrations of Biological Oxygen Demand and Total Suspended Solids than the incoming nitrified water. The in-line filter 44 helps reduce those concentrations.

This invention has been disclosed in terms of certain embodiments. It will be apparent that many modifications can be made to the disclosed apparatus without departing from the invention. Therefore, it is the intent of the claims to cover all such variations and modifications as come within the true spirit and scope of this invention.

What is claimed as new and desired to be secured by Letters Patent of the United States is:

1. A denitrification system for treating nitrified wastewater or nitrified water comprising:
   a series of interconnected tanks positioned underground, each tank having an inlet and an outlet and a conduit connecting an outlet of a preceding tank to an inlet of a succeeding tank;
   a first tank of said series of interconnected tanks receives at said inlet said wastewater or nitrified water having nitrates and nitrites;
   means for providing a detergent to said first tank, said detergent enhancing the reduction of said nitrates and nitrites to gaseous nitrous oxide ($N_2O$) and nitrogen ($N_2$);
   means for controlling the amount of detergent introduced into said first tank in accordance with the flow volume of said nitrified wastewater or said nitrified water entering said first tank; and
   at least one detention tank in said series of interconnected tanks coupled to an outlet of said first tank via said conduit for receiving effluent from said first tank.

2. The denitrification system as recited in claim 1 wherein each tank of said series of interconnected tanks is positioned lower in the ground than a previous one of said tanks to enable gravity flow of said effluent between said tanks.

3. The denitrification system as recited in claim 1 wherein said first tank comprises means for heating said effluent to accelerate denitrification of said nitrified wastewater or said nitrified water.

4. The denitrification system as recited in claim 3 wherein said means for heating said effluent includes heating said effluent to greater than 50 degrees Fahrenheit.

5. The denitrification system as recited in claim 1 wherein said at least one detention tank comprises a media to accelerate denitrification.

6. The denitrification system as recited in claim 1 wherein said system comprises a filter connected to said outlet of a last one of said detention tanks in said series of interconnected tanks.

7. The denitrification system as recited in claim 1 wherein said detergent comprises carbon for mixing with said nitrified wastewater or nitrified water.

8. The denitrification system as recited in claim 1 wherein said detergent comprises a synthetic compound including available carbon and a total organic content of approximately four percent.

9. The denitrification system as recited in claim 1 wherein said first tank of said system receives small doses of bacteria to initiate a denitrification process for treating said nitrified wastewater on said nitrified water.

10. A denitrification system for treating nitrified wastewater or nitrified water comprising:
    a series of interconnected tanks positioned underground, each tank having an inlet and an outlet and a conduit connecting an outlet of a preceding tank to an inlet of a succeeding tank;
    a first tank of said series of interconnected tanks receives at said inlet said nitrified wastewater or nitrified water having nitrates and nitrites;
    means for providing a detergent to said first tank, said detergent enhancing the reduction of said nitrates and nitrites to gaseous nitrogen dioxide nitrous oxide ($N_2O$) and nitrogen ($N_2$) in the resulting effluent;
    means for controlling the amount of detergent introduced into said first tank in accordance with a flow volume of said nitrified wastewater or said nitrified water entering said first tank;
    means disposed in one of said series of interconnected tanks for heating said effluent to accelerate denitrification;
    at least one detention tank in said series of interconnected tanks coupled to an outlet of said first tank via said conduit for receiving said effluent from said first tank;
    a pumping chamber connected to an outlet of a last detention tank in said series of interconnected tanks for receiving said effluent from said last detention tank; and
    a pump attached to said pumping chamber for pumping said effluent to an inlet of a filter, said effluent passing through said filter to an exit outlet.

11. The denitrification system as recited in claim 10 wherein each tank of said series of interconnected tanks is positioned lower in the ground than a previous one of said tanks to enable gravity flow of said effluent between said tanks.

12. The denitrification system as recited in claim 10 wherein said heating means heats said effluent to greater than 50 degrees Fahrenheit to accelerate denitrification of said nitrified wastewater or said nitrified water.

13. The denitrification system as recited in claim 10 wherein said detention tank comprises a media to accelerate denitrification.

14. The denitrification system as recited in claim 10 wherein said detergent comprises carbon for mixing with said nitrified wastewater or said nitrified water.

15. The denitrification system as recited in claim 10 wherein said detergent comprises a synthetic compound including available carbon and a total organic content of approximately four percent.

16. The denitrification system as recited in claim 10 wherein said first tank of said system receives a dose of bacteria to initiate a denitrification process for treating said nitrified wastewater or said nitrified water.

* * * * *